United States Patent
Indoh et al.

(10) Patent No.: US 6,730,335 B1
(45) Date of Patent: May 4, 2004

(54) PROCESS FOR PRODUCING LIGHT-COLORED SEASONING LIQUID

(75) Inventors: Kaoru Indoh, Tsukuba (JP); Suzue Iiyama, Akita (JP); Eiji Miyazaki, Ohi-machi (JP); Kenzo Okada, Ami-machi (JP); Sadao Nagata, Tokyo (JP)

(73) Assignee: Nisshin Flour Milling Inc., Tokyo (JP)

( * ) Notice: Subject to any disclaimer, the term of this patent is extended or adjusted under 35 U.S.C. 154(b) by 0 days.

(21) Appl. No.: 09/926,217

(22) PCT Filed: Jan. 27, 2000

(86) PCT No.: PCT/JP00/00416

§ 371 (c)(1),
(2), (4) Date: Sep. 25, 2001

(87) PCT Pub. No.: WO01/54517

PCT Pub. Date: Aug. 2, 2001

(51) Int. Cl.⁷ .................. A23L 1/105; A23L 1/20
(52) U.S. Cl. ............................. 426/18; 426/46
(58) Field of Search ................. 426/44, 46, 52, 426/49, 18, 60

(56) References Cited

U.S. PATENT DOCUMENTS

| | | | |
|---|---|---|---|
| 5,407,689 A | * 4/1995 | Muller et al. | 426/18 |
| 5,652,004 A | * 7/1997 | Nagata et al. | 426/44 |
| 5,665,407 A | 9/1997 | Nagata et al. | 426/18 |
| 5,702,749 A | * 12/1997 | Sugiura et al. | 426/638 |
| 5,869,115 A | * 2/1999 | Fukushima et al. | 426/20 |
| 5,888,561 A | * 3/1999 | Niederberger et al. | 426/20 |
| 6,054,150 A | * 4/2000 | Tobe et al. | 426/20 |
| 6,309,680 B1 | * 10/2001 | Lim et al. | 426/28 |
| 6,309,868 B1 | * 10/2001 | Monod et al. | 435/195 |
| 6,383,532 B1 | * 5/2002 | Lim et al. | 426/52 |
| 6,465,209 B1 | * 10/2002 | Blinkovsky et al. | 435/68.1 |

FOREIGN PATENT DOCUMENTS

| | | |
|---|---|---|
| JP | 41-10184 | 5/1966 |
| JP | 51-38496 | 3/1976 |
| JP | 57-48188 | 10/1982 |

* cited by examiner

*Primary Examiner*—Keith Hendricks
(74) *Attorney, Agent, or Firm*—Oblon, Spivak, McClelland, Maier & Neustadt, P.C.

(57) ABSTRACT

The present invention is drawn to a method for preparing a light-colored seasoning liquid, characterized by comprising koji-making by the employment of a raw material mixture containing soybeans or a similar material in an amount of 0–40% and, in an amount of 100–60%, raw material consisting of, on a dry weight basis, 25–100% gluten and 75–0% wheat, and subjecting a resultant koji product and 7–24% salt water to fermentation in a conventional manner. The invention provides a seasoning liquid which assumes a light color (JAS color code #35 or a lighter color), darkens slowly, provides a remarkable umami taste, and is endowed with excellent aroma.

10 Claims, No Drawings

“PROCESS FOR PRODUCING LIGHT-COLORED SEASONING LIQUID”

This application is a 371 of PCT/JP00/00416, filed Jan. 27, 2000.

TECHNICAL FIELD

The present invention relates to a method for producing a seasoning liquid, and more particularly to a method for producing a seasoning liquid which assumes a light color, undergoes a darkening process slowly, and has an excellent aroma with rich flavor and umami taste.

BACKGROUND ART

Production of an usukuchi soy sauce, which is a light-colored soy sauce, generally employs wheat serving as a source of starch, and soybeans or similar beans serving as a source of protein. However, conventional usukuchi soy sauces provides more saltiness than umami, because the amount of starch material to be mixed with protein material is slightly greater than that of the protein material, or salt concentration is raised so as to suppress coloration.

In addition, the darkening rate of conventional usukuchi soy sauces is very high, making the sauces unstable. Moreover, in order to attain a light color, fermentating period is shortened, or even further, a method for bleaching the produced soy sauce is employed. Thus, conventional usukuchi soy sauces have disadvantages in that the savory flavor is not satisfactory.

A method for producing a soy sauce having a light color and darkening slowly is disclosed in, for example, Japanese Patent Application Publication (kokoku) No. 57-48188, in which 10–30% (by weight) gluten is used together with at least one member selected from among corn, sorghum, or common millet serving as a source of starch, to thereby produce light-colored soy sauce having an excellent savory flavor and undergoing a darkening process slowly.

However, the aforementioned method has the following disadvantages: a) since starch materials other than wheat are employed, the aroma unique to wheat is not produced, b) corn, sorghum, and common millet have low glutamic acid content, and therefore the glutamic acid content of the resultant soy sauce also becomes low, resulting in an unsatisfactory umani taste, c) a satisfactory light color is not attained.

In view of the foregoing, the present inventors have undertaken various research efforts in an attempt to solve the above-described problems, and an object of the present invention is to provide a seasoning liquid which assumes a light color of No. 35 or higher in accordance with JAS color code (hereinafter, in the present description, the term "light color" refers to a color of No. 35 in accordance with JAS color code or lighter colors), which darkens slowly, and which has an excellent aroma with rich flavor and umami taste, and have found that, when at least gluten is employed as an essential material for koji-making and fermentation, and the salt concentration of water employed for fermentation is controlled to 7–24%, satisfactory results can be attained, thus leading to completion of the present invention.

DISCLOSURE OF THE INVENTION

Accordingly, the present invention provides a method for producing a light-colored seasoning liquid, characterized by comprising koji-making by the employment of a raw material mixture containing soybeans or a similar material in an amount of 0–40% and, in an amount of 100–60%, raw material consisting of, on a dry weight basis, 25–100% gluten and 75–0% wheat, and mixing the thus-obtained koji product and 7–24% salt water for fermentation.

BEST MODE FOR CARRYING OUT THE INVENTION

Gluten to be used in the present invention includes wheat gluten and corn gluten, with wheat gluten being particularly preferred. Either wet gluten or dry gluten obtained by drying wet gluten may be used, and dry gluten is particularly preferred. Examples of dry gluten include vital gluten powder and dry wheat gluten.

In the present invention, the wheat to be used as the starch material may be wheat grains or wheat flour.

The gluten or the mixture of gluten and wheat must be treated with heat so as to sufficiently denature the protein contained therein. Examples of preferred methods for heat treatment include a method in which steam is applied directly to gluten or a mixture of gluten and wheat, without addition of water, so as to control the water content thereof to fall within 12–18%, followed by formation of pellets by use of a pellet mill, and subsequently treating the resultant pellets in a high-pressure steam-cooking vessel at a gauge pressure of at least 1.0 kg/cm$^2$ for two minutes or more, and a method in which gluten or a mixture of gluten is extruded at a temperature equal to or higher than 110° C. by use of an extruder.

The thus-heat-treated gluten is completely deactivated, and exhibits no stickiness. Also, protein is denatured to a satisfactory degree. Therefore, when the thus-obtained gluten is appropriately ground, water is added thereto in such an amount that attains a water content of 35–50%, and used in koji-making, no operational problems arises. Rather, the swelling property of gluten provides an excellent bulkiness of material, which is quite beneficial to ventilated koji-making. In addition, when such gluten is mixed with heat-treated soybeans or a similar material, similar excellent koji-making property is exhibited. Moreover, the resultant koji product exhibits higher protease activity and glutaminase activity than in the case in which a greater amount of gluten is used.

In the present invention, soybeans or a similar material to be used as the protein material include, but are not limited to, defatted soybeans, whole soybeans, and ground soybeans. These are soaked in water, or water is added thereto; and then steam cooked, or alternatively, together with the aforementioned gluten and wheat flour, shaped through extrusion by use of an extruder at a temperature equal to or greater than 110° C., to thereby sufficiently denature the proteins contained therein.

According to the present invention, very important factors for attaining the object of the present invention are to control the proportions of gluten and wheat such that, on the basis of dry weight, gluten accounts for 25–100% and wheat accounts for 75–0% with respect to the total amount of the two materials employed, and to control the proportion of soybeans or a similar material such that soybeans or a similar material accounts for 0–40% of the entirety of the raw materials employed.

Regarding the proportions of gluten and wheat, gluten may be used alone without wheat being employed. However, in the case in which wheat is employed, the proportion of wheat must account for 75% or less and gluten must be incorporated in an amount of at least 25%. In this connection, when gluten is incorporated in an amount smaller than the above-mentioned amount, although the resultant seasoning liquid has a light color, the seasoning is prone to lack umami, and thus the object of the present invention cannot be attained.

When soybeans or a similar material is incorporated, the amount thereof must be 40% or less. If the amount of soybeans or a similar material is in excess of 40%, the resultant seasoning has an intense umami taste; however, not only is reddish tint originating from soybeans or similar material intensified, but also the seasoning has a higher rate of darkening with unsatisfactory savory flavor, and thus the object of the present invention cannot be attained.

In the present invention, it is also necessary that a koji product obtained from koji-making by use of the aforementioned raw material mixture be charged with 7–24% salt water for maturing through fermentation. When the salt concentration is less than 7%, putrefaction occurs due to a growth of unwanted microorganisms, whereas when the salt concentration is more than 24%, umami taste of the resultant seasoning liquid is unsatisfactory, and thus the object of the present invention cannot be attained. The fermentation maturing is allowed to proceed, under routine monitoring and control of moromi mash, for 2–5 months at 10–30° C., preferably for 2–3 months at 10° C.; or alternatively, for one month at 10° C. and subsequently for a further 1–2 months at 20° C. Thereafter the resultant moromi mash is subjected to filtration or pressing, to thereby yield a seasoning liquid such as soy sauce. The thus-yielded soy sauce or any other type of seasoning liquid has a light color, a slow darkening rate, a very rich umami taste, and an excellent aroma. In the present invention, when the volume of the salt water to be charged is 1.35–1.65 times the weight of the raw material mixture, even more remarkable results can be obtained. In the case in which the volume is less than 1.35 times the weight of the resultant mixture, although a very rich umami taste can be attained, the color is darkened, which is not preferable.

EXAMPLES

The present invention will next be described in detail by way of Example.

Example 1

A mixture of vital gluten powder (840 g) and wheat flour (560 g) was moistened through direct application of steam so as to attain a water content of 15%, and formed into pellets having a diameter of 4 mm by use of a pellet mill. Subsequently, the pellets were steam cooked for four minutes with saturated steam at a gauge pressure of 1.5 kg/cm$^2$, and then mashed to thereby yield a mashed product.

In the meantime, water (690 ml) was added to defatted soybeans (600 g) and the resultant mixture was steam-cooked for 30 minutes with saturated steam at a gauge pressure of 1.0 kg/cm$^2$, to thereby prepare steam-cooked soybeans.

To the above-obtained mashed product, water (420 ml) and then the steam-cooked soybeans were added, and the water content of the mixture was adjusted to 46%. Subsequently, seed koji was inoculated to the mixture and the resultant mixture was subjected to koji-making for 40 hours at 22–35° C., to thereby yield a koji product.

The thus-obtained koji product and salt water (3000 ml) having a salt concentration of 7.5% were charged in a tank for fermentation for three months at 10° C. The resultant mixture was pressed, to thereby yield a seasoning liquid.

The thus-obtained seasoning liquid had a color of JAS color code #43, which represents a very light color. The total nitrogen content of the seasoning liquid was as high as 3.02%, and moreover, the glutamic acid content was 4.54%, which is remarkably high, providing a very rich umami taste.

Test Example 1

A koji product obtained in a manner similar to that described in Example 1 and salt water having a salt concentration listed in Table 1 (3,000 ml) were charged in a tank for fermentation for one month at 10° C., and subsequently for a further two months at 20° C. The resultant mixture was pressed to thereby yield a seasoning liquid. Each of the thus-obtained seasoning liquid samples was tested with respect to the following criteria: JAS color code, total nitrogen (TN) content, glutamic acid (Glu) content, and amount of glutamic aid per unit amount of nitrogen (Glu/TN). The results are shown in Table 1.

TABLE 1

| No. | Salt (%) | JAS color code | TN (%) | Glu (%) | Glu/TN (mg/g) |
|---|---|---|---|---|---|
| 1 | 7 | 42 | 3.14 | 4.24 | 1350 |
| 2 | 15 | 40 | 2.99 | 4.38 | 1465 |
| 3 | 22 | 37 | 2.93 | 4.49 | 1532 |
| 4 | 24 | 35 | 2.95 | 4.07 | 1380 |
| 5 | 26 | 31 | 2.95 | 3.57 | 1210 |

Test Example 2

A koji product obtained in a manner similar to that described in Example 1 and salt water having a salt concentration of 15% (3,000 ml) were charged in a tank for fermentation under temperature conditions shown in Table 2. The resultant mixture was pressed, to thereby yield a seasoning liquid. Each of the thus-obtained seasoning liquid samples was tested with respect to the following criteria: JAS color code, total nitrogen (TN) content, glutamic acid (Glu) content, and the amount of glutamic acid per unit amount of nitrogen. The results are shown in Table 2.

TABLE 2

| | fermentation temp. (° C.) | | JAS color code | TN (%) | Glu (%) | Glu/TN (mg/g) |
|---|---|---|---|---|---|---|
| No. | 0–1 month | 1–3 months | | | | |
| 6 | 10 | 10 | 41 | 3.00 | 4.84 | 1613 |
| 7 | 10 | 20 | 40 | 2.99 | 4.38 | 1465 |
| 8 | 20 | 20 | 40 | 3.04 | 3.74 | 1230 |

Test Example 3

A koji product obtained in a manner similar to that described in Example 1 and salt water having a salt concentration of 22% in an amount shown in Table 3 were charged in a tank for fermentation for one month at 10° C., and subsequently for a further two months at 20° C. The resultant mixture was pressed to thereby yield a seasoning liquid. Each of the thus-obtained seasoning liquid samples was tested with respect to the following criteria: JAS color code, total nitrogen (TN) content, glutamic acid (Glu) content, and the amount of glutamic acid per unit amount of nitrogen. The results are shown in Table 3.

TABLE 3

| No. | Salt water (times) | JAS color code | TN (%) | Glu (%) | Glu/TN (mg/g) |
|---|---|---|---|---|---|
| 9  | 1.0  | 23 | 4.11 | 5.72 | 1392 |
| 10 | 1.2  | 29 | 3.81 | 5.21 | 1367 |
| 11 | 1.35 | 35 | 3.74 | 4.65 | 1243 |
| 12 | 1.65 | 37 | 3.49 | 4.04 | 1158 |
| 13 | 1.8  | 41 | 3.30 | 3.78 | 1145 |

Example 2

The procedure of Example 1 was repeated, to thereby yield a steam-cooked and mashed product of a mixture of vital gluten powder and wheat flour.

The water content of the mixture was adjusted to 46% through addition of water to the mashed product, followed by addition of seed koji, and subsequently the mixture was subjected to koji-making for 40 hours at a temperature of 22–35° C., to thereby yield a koji product. The thus-obtained koji product and salt water (7.5%, 3,000 ml) were mixed, and allowed to ferment for three months at 10° C. The resultant mixture was pressed, to thereby yield a seasoning liquid.

The thus-obtained seasoning liquid assumed a very light color, a color of JAS color code #49. The total nitrogen content of the seasoning liquid was as high as 3.64%, and moreover, the glutamic acid content was 5.89%, which is remarkably high providing a very rich umami taste.

Test Example 4

A koji product obtained in a manner similar to that as described in Example 2 and salt water (3,000 ml) having a salt concentration shown in Table 4 was prepared for fermentation under temperature conditions listed in Table 4. The resultant mixture was pressed to thereby yield a seasoning liquid. Each of the thus-obtained seasoning liquid samples was tested with respect to the following criteria: JAS color code, total nitrogen (TN) content, glutamic acid Glu) content, and the amount of glutamic acid per unit amount of nitrogen. The results are shown in Table 4.

TABLE 4

| | | Fermentation temp. (° C.) | | | JAS | | | |
|---|---|---|---|---|---|---|---|---|
| No. | Salt (%) | 0–1 month | 1–2 months | 2–3 months | color code | TN (%) | Glu (%) | Glu/TN (mg/g) |
| 14 | 7  | 10 | 10 | 10 | 49 | 3.64 | 5.89 | 1618 |
| 15 | 15 | 10 | 10 | 10 | 48 | 3.24 | 5.80 | 1790 |
| 16 | 15 | 10 | 20 | 20 | 45 | 3.49 | 5.16 | 1479 |
| 17 | 15 | 10 | 20 | 25 | 43 | 3.39 | 5.10 | 1504 |
| 18 | 15 | 20 | 20 | 20 | 44 | 3.59 | 4.77 | 1329 |
| 19 | 22 | 10 | 10 | 10 | 47 | 2.92 | 5.32 | 1822 |
| 20 | 22 | 10 | 20 | 20 | 42 | 3.15 | 4.94 | 1568 |
| 21 | 22 | 10 | 20 | 25 | 40 | 3.40 | 4.97 | 1462 |
| 22 | 22 | 20 | 20 | 20 | 41 | 3.28 | 4.47 | 1363 |

INDUSTRIAL APPLICABILITY

The present invention enables manufacture of a seasoning liquid product which assumes a very light color (JAS color code #35 or a lighter color), darkens slowly, has a stable color and gloss, provides a remarkable umami taste, and is endowed with excellent aroma.

What is claimed is:

1. A method for preparing a light colored seasoning liquid, comprising forming a Koji-making material comprising a raw material mixture comprising (a) a first component comprising 0–40% soybeans and (b) a second component comprising 60–100% gluten and wheat, wherein the gluten is present in an amount of 25–100%, the wheat is present in an amount 0–75% relative to the total of the gluten-containing second component, the percentages being on a dry weight basis, adding 22% salt water to said koji making material and subjecting the resulting mixture to fermentation by adding seed Koji, wherein the salt water is employed in a volume amount 1.35–1.50 times the weight of the raw material mixture, and wherein the fermentation is carried out for 2–3 months at 10° C.; or for one month at 10° C. and subsequently for a further 1–2 months at 20° C.

2. The method according to claim 1, wherein the fermentation is carried out for 2–3 months at 10° C.

3. The method according to claim 1, wherein the fermentation is carried out for one month at 10° C. and subsequently for a further 1–2 months at 20° C.

4. The method according to claim 1, wherein the amount of the first component is 0%.

5. A method for preparing a light colored seasoning liquid, comprising forming a Koji-making material comprising a raw material mixture comprising (a) a first component comprising 0–40% soybeans and (b) a second component comprising 60–100% gluten and wheat, wherein the gluten is present in an amount of 25–100%, the wheat is present in an amount 0–75% relative to the total of the gluten-containing second component, the percentages being on a dry weight basis, adding 7–24% salt water to said koji making material and subjecting the resulting mixture to fermentation by adding seed Koji, wherein the salt water is employed in a volume amount 1.50 times the weight of the raw material mixture, and wherein the fermentation is carried out for 2–3 months at 10° C.; or for one month at 10° C. and subsequently for a further 1–2 months at 20° C.

6. The method according to claim 5, wherein the salt concentration is 7%.

7. The method according to claim 5, wherein the salt concentration is 7.5%.

8. The method according to claim 5, wherein the salt concentration is 15%.

9. The method according to claim 5, wherein the salt concentration is 22%.

10. The method according to claim 5, wherein the salt concentration is 24%.

* * * * *